United States Patent Office 2,791,040
Patented May 7, 1957

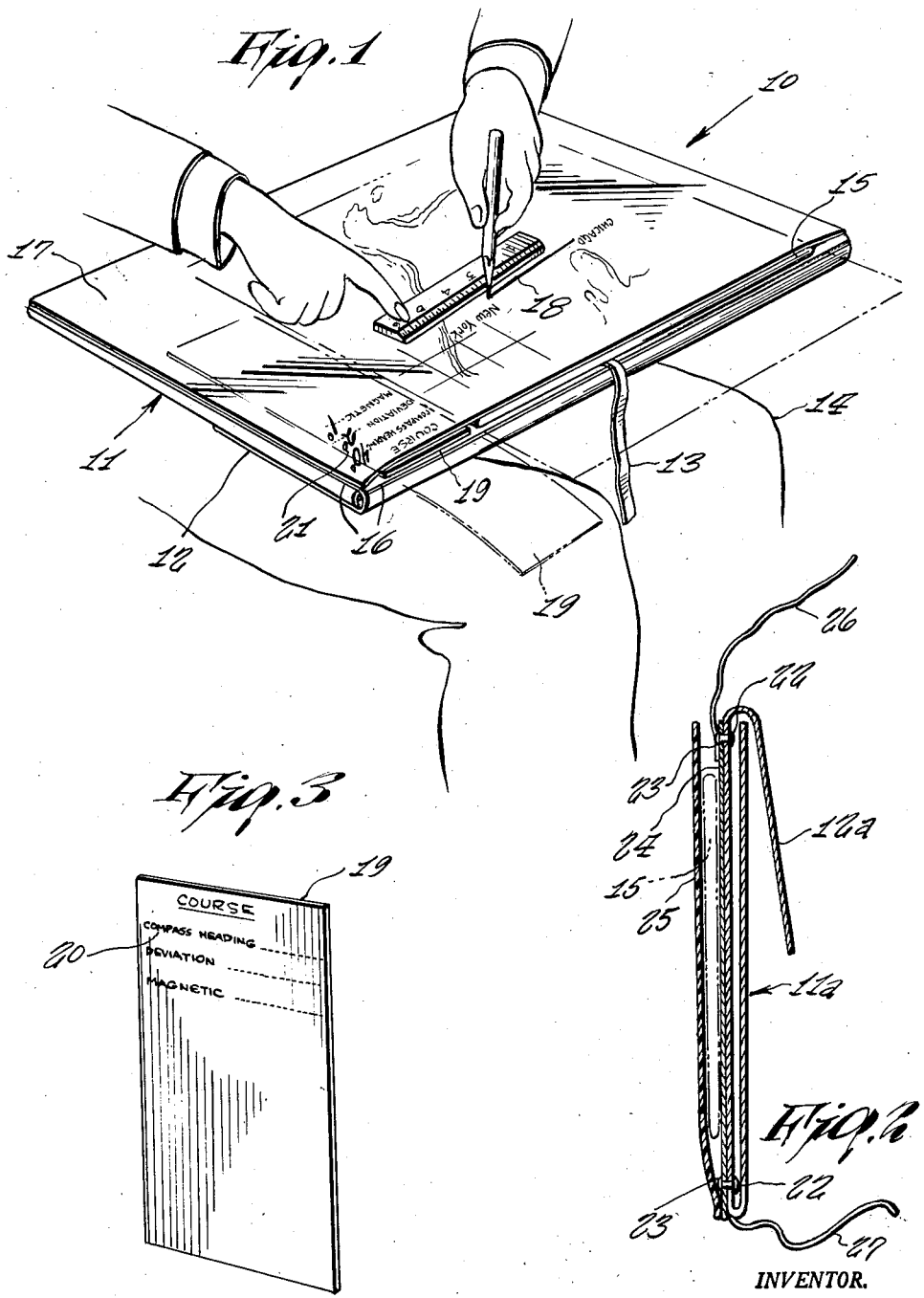

2,791,040

MAP FOLIO

Salvatore L. Santorelli, Beechhurst, N. Y.

Application November 16, 1953, Serial No. 392,245

2 Claims. (Cl. 35—62)

This invention relates to map folios.

Private pilots and yachtsmen mark off their flight plan or course on a navigation map normally retained in a folio provided for the same and during navigation, with the map resting on top of the back of the folio as a support, it is customary to check off the landmarks as they are actually passed. However, this has the disadvantage in that the check points are checked directly on the map and before a new course or flight plan may be plotted, these check points must be erased whereupon the entire process is repeated over and over again. This procedure suffers from the obvious disadvantage in that the map soon becomes illegible due to the constant erasing, if not entirely rendered useless.

It is accordingly a principal object of the present invention to provide an improved map folio wherein the necessity for checking off the check points of the flight plan or course directly on the map and then erasing the same is eliminated.

It is another object of the present invention to provide an improved map folio adapted to contain the maps when not in use and which is provided with a rigid backing serving as a support for the map when being used.

It is still another object of the present invention to provide an improved map folio of the above type wherein a pocket is formed on the rigid backing of the folio from a flexible sheet of acetate and within which the map is received during navigation, one side of the acetate being frosted and adapted to receive thereon the checks or lines, while the map itself is visible therebelow.

It is still another object of the present invention to provide an improved map folio attachment wherein a rigid backing and acetate pocket formed thereon may be quickly and readily snapped on and off of a conventional folio.

It is still another object of the present invention to provide in an improved map folio of the above type a pocket slightly wider than the map itself and adapted to receive therein a slip of printed material on which readings may be recorded pertinent to the navigation, one side of said slip being adapted for aerial navigation, while the other side thereof is adapted for water navigation.

Other objects of the present invention are to provide improved map folio bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a perspective view of a map folio embodying the features of the present invention and shown in operative use on the lap of a pilot;

Fig. 2 is a vertical sectional view of a modified form of the present invention; and Fig. 3 is a perspective view of a data slip adapted to be used in connection with the present invention.

Referring now more in detail to the drawing, wherein similar reference numerals identify corresponding parts throughout the several views, and referring particularly to Figs. 1 and 3, there is shown a map folio embodying the features of the present invention, referred to collectively as 10, and including a folio or large envelope 11 of cardboard or other suitable material, substantially as illustrated. The envelope 11 includes the usual flap 12 as well as the ribbons 13 and 14 for securing the same in a closed position. The envelope 11 is adapted to contain therewithin the map 15 to be used in connection with aerial or water navigation.

In the practice of my invention, the envelope 11 is provided with a rigid backing on the side thereof remote from flap 12 and designated by the numeral 16 whereupon the map 15 may be supported thereon when the folder or envelope rests upon the lap of the pilot, as shown in Fig. 1. A pocket is formed on the rear rigid back of the envelope 11 by means of a sheet of transparent acetate 17 having a frosted outer surface adapted to receive thereon pencil markings 18 which may then be easily and readily erased due to the composition of the sheet 17 without in any way marring the same. The sheet 17 is secured along each end and the longitudinal edge thereof remote from flap 12 whereby to provide the pocket opening and to contain the map 15 in the manner shown. It will be noted that the map 15 is of slightly less width than the sheet 17 providing a space at one side into which is inserted a data sheet 19 (Fig. 3). The sheet 17 may, of course, be secured along its edges in any suitable manner to the back of the envelope 11.

As shown in Fig. 3, the data sheet 19 is printed with material 20 descriptive of the course readings and provided with spaces which will underlie plastic sheet 17 and over which will be provided the readings 21 marked on the outer face of sheet 17. The reverse side of data sheet 19, not shown, is provided with similar descriptive matter only adapted to be used in connection with water navigation. Thus, the map folio is adapted for both pilots and yachtsmen depending upon which face of the data sheet 19 is disposed uppermost.

With the map disposed intermediate the back of envelope 11 and sheet 17 and with the data sheet 19 in the proper position, both the map and the printed matter on sheet 19 will be visible through the transparent sheet 17. As the flight or course proceeds, the check points may be marked directly on to the sheet 17 in superimposed relation to the visible map 15 while the readings 21 may also be marked on to the sheet 17 directly over the appropriate spaces of data sheet 19 visible therethrough. When the flight or course has been completed, the markings 18 and 21 are readily and easily erased without damage to the actual map itself which may be used indefinitely.

Referring now particularly to Fig. 2, there is shown a modified form of the present invention wherein a cardboard folio 11a having a flap 12a adapted to contain therewithin the map 15 is provided on its rear face with a plurality of snap fastening elements 22 adapted to cooperate with complementary snap fastening elements 23 mounted in a rigid sheet of material 24 whereby the latter may be easily and readily mounted upon the back of the envelope to provide the same with a rigid backing for the same purpose as the first form of the invention. A sheet of transparent acetate 25 is again secured along its three edges to the rigid backing 24 in suitable manner whereby to provide a pocket adapted to receive therewithin the map 15. The usual strings 26 and 27 for securing the folder 11a in a closed position are provided. This form of the invention has the advantage over the previous form in that the rigid backing 24 and pocket forming sheet 25 may be snapped from the folder and carried inside, if desired, along with the map and thus further protect the sheet 25 when not in use.

The printed sheet 19, if desired, may be permanently secured to the back of the folio, in which case it would be provided on the same face with the appropriate descriptive matter 20 pertaining to both yachting and flying. It will also be readily apparent that the rigid backing may be formed integral with the folio or detachably connected thereto, without departing from the scope of the invention in any way. Also, while I have described the invention in connection with a sheet 17 of transparent acetate having a frosted outer surface, it will be apparent that any other suitable material having the same properties of receiving the pencil markings and permitting the same to be readily erased may, of course, be used.

While various changes may be made in the detail construction, it shall be understood that such changes shall be within the spirit and scope of the present invention, as defined by the appended claims.

Having thus set forth and disclosed the nature of my invention, what is claimed is:

1. A map folio comprising an envelope adapted to contain the maps therewithin, said envelope including a flap closure and flexible strips for securing said closure in the closed position, a rigid backing provided on the side of said envelope remote from said closure and of substantially the same size as said envelope, a sheet of transparent acetate mounted on the back of said envelope and coinciding therewith, said sheet being secured to said envelope along three edges whereby to form a pocket receiving the map therewithin, the outer surface of said acetate sheet being frosted to facilitate marking thereon.

2. A map folio comprising in combination an envelope adapted to contain the maps and including a closure flap and means for securing said closure flap in the closed position, a plurality of snap fastening elements disposed on the back of said envelope on the side remote from said flap, a rigid backing substantially the same in size as the back of said envelope, complementary snap fastening elements mounted in said rigid backing adapted to cooperate with said first mentioned snap fastening elements whereby to releasably mount said rigid backing on the back of said envelope, and a transparent sheet of material secured to said rigid backing along three edges whereby to provide a pocket receiving the map therewithin, said sheet being formed of acetate and frosted on the outer face.

References Cited in the file of this patent

UNITED STATES PATENTS

| | | |
|---|---|---|
| 470,861 | Chichester | Mar. 15, 1892 |
| 1,421,975 | Meyers | July 4, 1922 |
| 1,508,692 | Goewey | Sept. 16, 1924 |
| 1,587,506 | Charlton | June 8, 1926 |
| 1,613,570 | Shotwell | Jan. 4, 1927 |
| 2,294,276 | Callinicos | Aug. 25, 1942 |
| 2,420,673 | Monrad | May 20, 1947 |
| 2,655,156 | Caldwell | Oct. 13, 1953 |
| 2,663,095 | Chase | Dec. 22, 1953 |

FOREIGN PATENTS

| | | |
|---|---|---|
| 328,140 | Germany | Oct. 23, 1920 |